United States Patent [19]

Laig-Horstebrock et al.

[11] Patent Number: 4,865,927
[45] Date of Patent: Sep. 12, 1989

[54] ELECTROCHEMICAL CELL

[75] Inventors: Helmut Laig-Horstebrock, Frankfurt; Winfried Krey, Ellwangen, both of Fed. Rep. of Germany

[73] Assignee: Varta Batterie Aktiengesellschaft, Hanover, Fed. Rep. of Germany

[21] Appl. No.: 210,590

[22] Filed: Jun. 23, 1988

[30] Foreign Application Priority Data

Aug. 3, 1987 [DE] Fed. Rep. of Germany ....... 3725629

[51] Int. Cl.[4] ......................... H01M 6/04; H01M 4/50; H01M 4/60
[52] U.S. Cl. ...................................... 429/50; 429/206; 429/214; 429/224; 252/182.1
[58] Field of Search ............... 429/206, 224, 212, 214, 429/50; 252/182.1

[56] References Cited

U.S. PATENT DOCUMENTS 4,520,083  5/1985  Pratr et al. ...................... 429/105 X
4,643,958  2/1987  Thrash et al. ........................ 429/105

OTHER PUBLICATIONS

Chem. Abs. vol. 101, No. 8481G, 1984.
Chem. Abs. vol. 98, No. 145206E, 1983.
Chem. Abs. vol. 92, No. 24037T, 1980.
Chem. Abs. vol. 88, No. 107896R, 1978.

*Primary Examiner*—Stephen J. Kalafut
*Attorney, Agent, or Firm*—Weiser & Stapler

[57] ABSTRACT

Alkaline $MnO_2$/Zn cells having nickel-plated steel cups as the cathode collector show deterioration of their discharge characteristics after high-temperature storage, which can be prevented by an additive in the cathode paste which forms a strong complex with nickel. Nickel oxide layers of high ohmic resistance, which are the cause of the contact resistance between the cathode and the nickel coating of the steel cup, are accordingly dissolved or transformed. Imidazole, 2-picolinic acid, dimenthylglyoxime, 4,5-dihydroxbenzene-1,3-disulfonic acid and 1,10-phenanthroline are particularly effective additives for compounding into the cathode. Preferred amounts are between 0.001 wt. % and 1 wt. %.

14 Claims, 1 Drawing Sheet

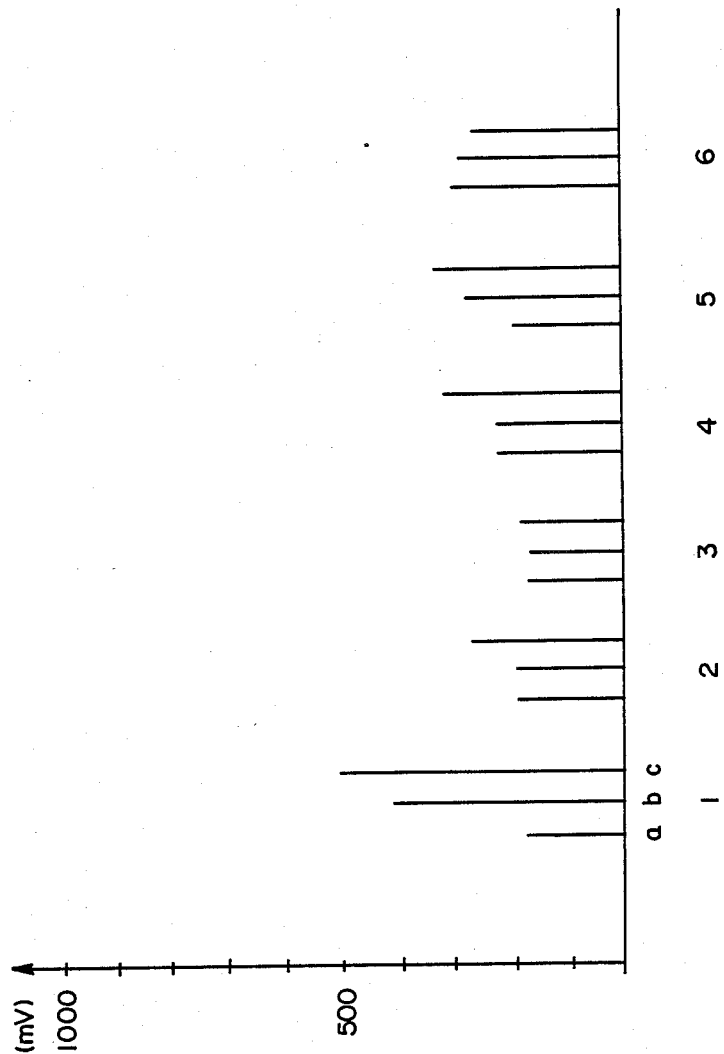

ELECTROCHEMICAL CELL

BACKGROUND OF THE INVENTION

The present invention generally relates to galvanic cells of the type which include a nickel-plated steel cup which functions as a current collector, a cathode which comprises and preferably essentially consists of manganese dioxide and a conductive agent pressed into the steel cup, a zinc anode, a separator and an aqueous alkaline electrolyte.

General experience has shown that alkaline manganese dioxide/zinc cells of this type have substantially poorer discharge characteristics after storage at temperatures substantially in excess of room temperature than in their freshly prepared state. In particular, losses of capacity tend to occur. The development of a contact or interface resistance between the $MnO_2$ electrode (pressed in the shape of a ring) and the nickel substrate of the steel cup has been identified as the cause of this phenomenon.

It has been demonstrated by especially designed experiments that several factors may contribute, to differing extent, to the development of this interfacing layer. However, an exception to these factors is the alkali selected for the electrolyte since there are no specific differences between cells with pure KOH, NaOH or LiOH electrolytes in terms of their electrical characteristics.

In contrast, it has been found that manganese has a marked unfavorable effect in terms of this contact resistance. This can be concluded from the exhibited increase in the resistance of nickel plates when immersed into an alkaline $MnSO_4$ solution and when positively polarized in the solution for a short time. In such cases, thin layers which have the assumed composition of $Mn(OH)_x$ (in which $x>2$) are formed on the nickel surface. These layers are also formed in pure $MnSO_4$ solutions which are weakly acidic, due to hydrolysis, with such layers tending to an even greater increase in resistance.

It has further been observed that with respect to the stability of manganese dioxide during storage at elevated temperatures, polarization with an amount of current corresponding to about 2% of the total capacity of the manganese dioxide causes no additional deterioration of the loss of capacity commonly experienced. However, this tends to cause a corresponding polarization during discharge (predischarge), during which the contact resistance markedly increases.

Also recognized as an influential factor affecting contact resistance is the dissolution of metallic impurities from the manganese dioxide, which leads to an increase in resistance or the pressure which is needed to prepare the electrode. High pressures are apparently unfavorable since the prepared electrode bodies are then relatively brittle and become mechanically soft all the more rapidly during the swelling which inevitably follows.

A known measure for reducing this contact resistance deals with the current collector or take-off, rather than the electrode material, and primarily requires that the current collector be chemically inert. Thus, it is proposed in DE-PS No. 1,421,582 that the positive steel cup of a primary galvanic cell be internally plated, preferably with gold. The disadvantages of this measure are the high price of gold as well as the processes and costs involved with galvanic gold-plating.

SUMMARY OF THE INVENTION

It is therefore the principal objective of the present invention to provide an alkaline manganese cell with a housing cup which is made from steel and nickel-plated in conventional manner, yet which has substantially improved stability during storage at elevated temperatures compared to those commonly encountered in practice.

This and other objectives of the invention are accomplished by providing an electrochemical cell of improved stability and which exhibits lower capacity losses, especially at elevated temperatures, which comprises a nickel-plated steel cup which functions as a current collector, a zinc anode, an aqueous alkaline electrolyte, a separator, and a cathode in contact with the steel cup which comprises manganese dioxide and a complex-forming chemical which reacts with nickel oxide surface films in a strongly alkaline medium.

For further detail regarding preferred galvanic cell constructions in accordance with the present invention, reference is made to the detailed description which follows, taken in conjunction with the accompanying Figure which shows a graph illustrating the improved performance characteristics of such galvanic cells.

DETAILED DESCRIPTION OF PREFERRED EMBODIMENTS

In accordance with the present invention, it has been found and confirmed that an undesirable contact resistance between the cathode and the cell cup is responsible for the capacity losses which are particularly prevalent during high-temperature storage of the cells. Moreover, it has been discovered that this contact resistance is especially dependent upon, and is caused by, the formation of a nickel oxide layer of high ohmic resistance on the nickel coating of the current-collecting cell cup. In accordance with the present invention, it has been found that certain additives can be added to the manganese dioxide electrode or to the electrolyte to prevent this surface layer from forming, reducing the contact resistance in the presence of such additives.

Those compounds which have been found useful in accordance with the present invention form strong complex salts with nickel in alkaline media. By a "strong" complex salt there is intended a complex salt that will not disassociate under conditions of use.

Compounds which may be particularly well suited for purposes of the present invention are unsaturated nitrogen containing compounds, either cyclic or acyclic, which are adapted to or capable of forming a complex due to the presence of at least one C=N— double bond with one free electron pair on the nitrogen, and of forming ligands with substitutable hydrogen atoms. The compounds may contain one or more nitrogen atoms.

One of average skill in the art can without undue experimentation select such compounds, which form strong complex salts with nickel in alkaline media. The invention contemplates not only the compounds described above, and to be described below, but also all functionally equivalent compounds (i.e., those that perform substantially in the same manner to give substantially the same results).

Illustrations of the group of complexing compounds for use in the present invention include but are not limited to the following: monocyclic or polycyclic N- heterocyclic compounds having either a 1,3-diazole structure, an o-phenanthroline structure or a structure containing at least one carboxyl group at the ortho position with respect to a nitrogen atom, or compounds of the 1,2-dioxime type, or the o-dihydroxybenzenesulfonic acids as well as their salts.

The additives with Ni-complexing effect according to the present invention include the following illustrative compounds of the above-named N-heterocyclic compounds:

imidazole

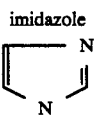

1,10-phenanthroline

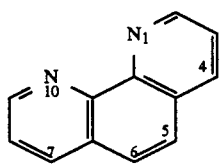

2-picolinic acid (pyridinecarboxylic acid-(2))

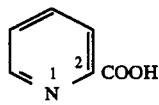

pyridine-2,6-dicarboxylic acid

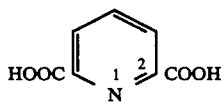

Illustrative additives according to the present invention of the group of the 1,2-dioximes also include:

dimethylglyoxime

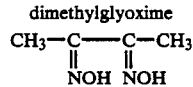

and others from the sulfonic acid type, like:

o-dihydroxybenzene-1,3-disulfonic acid (Tiron)

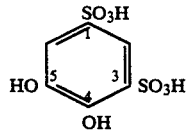

It is apparent that one skilled in the art will be able to select appropriate complexing compounds in accordance with the present invention which have the desired effect as described above. Also useful are derivatives (e.g., esters, amides, etc.,) of the above compounds which have the same desired effect. When of the above compounds which have the same desired effect. When salts are considered, they are so selected as not to affect the desired strong alkaline pH of the medium, such as the alkaline earth metal or alkali salts.

For additional compounds from which suitable complexing compounds may be selected for use in accordance with the present invention, and in accordance with the above criteria, reference is made to the Handbook of Chemistry and Physics, 62nd Edition, CRC Press (pages C-35-C-38), which are incorporated herein by reference. Of course, other sources of suitable compounds are available in the literature.

The surprising effect of such additives was experimentally determined in a special resistance measuring apparatus. For testing, manganese dioxide electrode tablets containing 0.2 wt.% of a suitable complexing compound (for instance one of the above-mentioned complexing compounds) were pressed onto nickel plates under a pressure of 75 kp/cm$^2$, impregnated with 40% KOH and stored at 90° C. The dimensions of the manganese dioxide tablets were 10×5mm (diameter×height), and their basic composition was 88 wt.% $MnO_2$, 10 wt.% graphite (added to improve electrical conductivity) and 2 wt. % polyethylene (as a binder).

The resistance measuring apparatus was encapsulated so that drying and reaction with atmospheric $CO_2$ were not possible. An electric current was applied for measurement from the manganese dioxide tablets to the nickel plate via the contact surface, and the voltage drop across the contact surface was recorded. The test electrodes were then measured in three different states at a test current of 500 mA:

(a) immediately after assembly of the measuring system,
(b) after storage at 90° C. for 24 hours, and
(c) after storage at 90° C. for 96 hours.

The relatively short storage time in combination with the relatively high storage temperature used is sufficient to recognize the favorable effect of a particular additive, and to compare its performance with another additive. This is because the effect of a 90° C. storage for one month approximately corresponds to the effect of a storage at room temperature for 1.0 to 1.5 years.

The bar graphs of the Figure show how the voltage drop measured across the transition between the manganese dioxide tablet and the nickel plate, an indicator of the contact resistance between the cathode and the plate, decreases as a result of various additives as compared to a manganese dioxide tablet containing no additive. The bar graphs of each triplet pertain to the states (a), (b) and (c), as defined above, respectively. The additives added to the tablet were as follows:

1=standard (without additive),
2=imidazole,
3=2-picolinic acid,
4=dimethylglyoxime,
5=4,5-dihydroxybenzene-1,3-disulfonic acid,
6=1,10-phenanthroline.

It can be readily observed that the contact resistance is reduced by 2-picolinic acid by a factor of almost 3 when compared to the standard specimen. The effect of the additive is assumed to result from dissolution of the poorly conducting nickel oxides on the surface of the cathode collector, which leads to a good electrical contact with the nickel substrate.

The addition of the complexing agent used in accordance with the present invention can be integrated with the manufacturing process without adversely affecting the manufacture of the galvanic cells. The simplest method is to mix the active substances in dry form with the positive electrode paste, which also contains a conventional conductive agent (e.g., graphite, carbon black, etc.) and a binder. However, it is also possible to dissolve the complexing substance, if not itself a liquid (in which case it is mixed with the electrolyte), in a small amount of electrolyte and to then impregnate the electrode with the solution thus obtained.

The amount of the complexing additive added according to the present invention is advisably between about 0.001 wt. % and about 1 wt. % of the cathode paste. Increasing the amount of the additive beyond 1 wt. % does not appear to promote the favorable effect of the additive and therefore is not cost efficient. Smaller amounts do not seem to have a sufficiently advantageous effect.

It should be noted that but for the complexing agent which is used in accordance with the present invention, the remaining components are conventional in the manufacture of electrochemical cells having manganese dioxide cathodes, and reference can therefore be made to the recognized teaching in this field for appropriate components to be used in this regard. It will further be understood that various changes in the details, materials and arrangement of parts which have been herein described and illustrated in order to explain the nature of this invention may be made by those skilled in the art within the principle and scope of the invention as expressed in the following claims.

We claim:

1. An electrochemical cell having improved stability, lower capacity losses especially after storage at high temperature and substantially reduced nickel oxide formation on the surface of the cathode collector which cell comprises a nickel-plated steel cup which functions as a current collector, a zinc anode, a strongly alkaline aqueous electrolyte, a separator, a manganese dioxide cathode in contact with the steel cup and with a complex-forming chemical other than phenanthroline which chemical minimizes formation of poorly conductive nickel oxide surface films in the strongly alkaline electrolyte, thereby reducing contact resistance between the cathode and current collector and causing a more constant electrical current output.

2. The electrochemical cell of claim 1 wherein the complex-forming chemical is selected form the group consisting of monocyclic or polycyclic aromatic N-heterocyclic compounds having a 1,3-diaole structure, an o-phenanthroline structure or a structure containing at least one carboxyl group at the ortho position with respect to a nitrogen atom, a 1,2-dioxime and a dihydroxy-benzenesulfonic acid.

3. The electrochemical cell of claim 1 wherein the complex-forming chemical is dissolved in the aqueous alkaline electrolyte.

4. The electrochemical cell of claim 1 wherein the complex-forming chemical is impregnated into the cathode.

5. The electrochemical cell of claim 1 wherein the cathode contains the complex-forming chemical.

6. The electrochemical cell of claim 5 wherein the complex-forming chemical is present in the cathode in an amount between about 0.001% wt. and about 1% wt. relative to the cathode pate.

7. An electrochemical cell of improved stability, lower capacity losses especially after storage at high temperature and substantially reduced nickel oxide formation on the surface of the cathode collector which cell comprises a nickel-plated steel cup which functions as a current collector, a zinc anode, a strongly alkaline aqueous electrolyte, a separator, a manganese dioxide cathode in contact with the steel cup and with a complex-forming chemical selected from the group consisting of imidazole, 2-picolinic acid and pyridine-2,6-dicarboxylic acid which minimizes formation of poorly conductive nickel oxide surface films in the strongly alkaline electrolyte, thereby reducing contact resistance between the cathode and current collector and causing a more constant electrical current output.

8. An electrochemical cell of improved stability, lower capacity losses especially after storage at high temperature and substantially reduced nickel oxide formation on the surface of the cathode collector which cell comprises a nickel-plated steel cup which functions as a current collector, a zinc anode, a strongly alkaline aqueous electrolyte, a separator, a manganese dioxide cathode in contact with the steel cup and with 4,5-dihyddroxybenzene-1,3-disulfonic acid which minimizes formations of poorly conductive nickel oxide surface films in the strongly alkaline electrolyte, thereby reducing contact resistance between the cathode and current collector and causing a more constant electrical current output.

9. The electrochemical cell of claim 8 wherein the 4,5-dihydroxybenzene-1,3-disulfonic acid is present in the cathode in an amount between about 0.0001% wt. and about 1% wt. relative to the cathode paste.

10. A cathode for an electrochemical cell of improved stability, lower capacitor losses especially after storage at high temperature which has a nickel-plated steel cup and a zine anode, which cathode contains manganese dioxide and a complexing agent in an amount between 0.001% wt. and about 1% wt. relative to the cathode paste so that the formation of poorly conductive nickel oxide surface films is minimized, and causing a more constant electrical current output, thereby reducing contact resistance between the cathode and current collector, said complexing agent being other than phenanthroline and selected from the group consisting of monocyclic or polycyclic aromatic N-heterocyclic compounds having a 1,3-diazole structure, an o-phenenthroline structure or a structure containing at least one carboxyl group at the ortho position with respect to a nitrogen, a 1,2-dioxime and a o-dihydroxybenzenesulfonic acid.

11. An electrochemical cell of improved stability, lower capacitor loses especially after storage at high temperature and substantially reduced nickel oxide formation on the surface of a cathode collector which cell comprises a nickel-plated steel cup which functions as a current collector, a zinc anode, a strongly alkaline aqueous electrolyte, a separator, a manganese dioxide cathode in contact with the steel cup said cathode containing 1,10-phenanthroline which minimizes formation of poorly conductive nickel oxide surface films in the strongly alkaline electrolyte, thereby reducing contact resistance between the cathode and current collector and causing a more constant electrical current output.

12. The electrochemical cell of claim 11 wherein the complex-forming chemical is present in the cathode in an amount between about 0.001% wt. and about 1% wt. relative to a cathode paste.

13. A method for the production of an electric current with an electrochemical cell of improved stability, lower capacity loss after storage at high temperature which comprises generating an electric current in an electrochemical cell having a manganese dioxide cathode in contact with a nickel-plated steel current collector, a zinc anode, a strongly alkaline aqueous electrolyte, a separator and a complex-forming chemical which minimizes the formation of nickel oxide and reducing the drop in voltage between the cathode and current collector during the production of the electric current.

14. The method of claim 13 wherein the complex-forming chemical is selected from the group consisting of imidazole, 2-picolinic acid, pyridine-2,6-dicarboxylic acid and 4,5-dihydroxybenzene-1,3-disulfonic acid.

* * * * *